United States Patent Office 3,239,499
Patented Mar. 8, 1966

3,239,499
TETRACYCLINE DERIVATIVE
Hans H. Rennhard, Lyme, and Charles R. Stephens, Jr.,
Niantic, Conn., assignors to Chas. Pfizer & Co., Inc.,
New York, N.Y., a corporation of Delaware
No Drawing. Filed May 19, 1961, Ser. No. 111,190
20 Claims. (Cl. 260—192)

The present invention is concerned with a novel group of biologically active D-ring substituted tetracycline antibiotics, methods for the preparation thereof, and with a novel group of aromatic azo compounds useful as intermediates in their preparation. More specifically, it is concerned with a series of tetracycline antibiotic-diazonium salt coupling products, the transformation thereof into novel biologically active products, and with the products so produced. These aromatic azo compounds which are produced by the diazonium salt coupling reaction have low biological activity in the standard tetracycline antibiotic bioassay procedures, but they are uniquely suited intermediates for the synthesis of new and hitherto unknown tetracycline antibiotics and have biological properties not shared by prior tetracyclines. Exemplary of the tetracycline antibiotics, which can be prepared from these novel aromatic azo compounds are 6-deoxy-9-chlortetracycline, 6-deoxy-6-demethyl-7-fluorotetracycline, 6-deoxy - 6 - demethyl - 7 - nitrotetracycline, and 6-deoxy - 6 - demethyl-7-aminotetracycline as well as other D-ring substituted tetracyclines containing a cyano, fluoro, chloro, bromo, iodo, amino, cyanato, thiocyanato, nitro, arsonoxy, mercapto, azido, or alkylmercapto group in the 7 or 9 positions.

This patent application is a continuation-in-part of our copending patent application Serial No. 847,867, filed October 22, 1959, which in turn is a continuation-in-part of Serial No. 802,655, filed March 30, 1959, now abandoned.

The tetracycline antibiotics comprise a group of biologically active octahydronaphthacene derivatives having the following essential structural features. The number system indicated is that employed by "Chemical Abstracts."

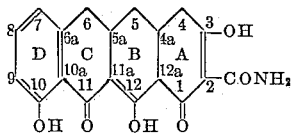

Among the known biologically active members of this series are those containing the following substituent groups. Each of these can be converted into D-ring substituted tetracyclines by the present method.

| Substituents: | Common name |
|---|---|
| 4-N(CH$_3$)$_2$, 6-OH, 6-CH$_3$ | Tetracycline. |
| 4-N(CH$_3$)$_2$, 5-OH, 6-OH, 6-CH$_3$ | 5-oxytetracycline. |
| 4-N(CH$_3$)$_2$, 6-OH, 6-CH$_3$ 7-Cl | 7-chlortetracycline. |
| 4-N(CH$_3$)$_2$, 6-OH | 6-demethyltetracycline. |
| 4-N(CH$_3$)$_2$, 6-OH, 7-Br | 6-demethyl-7-bromtetracycline. |
| 4-N(CH$_3$)$_2$, 5-OH, 6-CH$_3$ | 6-deoxy-5-oxytetracycline. |
| 5-OH, 6-CH$_3$, 6-OH | 4-desdimethylamino-5-oxytetracycline. |
| 4-N(CH$_3$)$_2$, 6-CH$_3$ | 6-deoxytetracycline. |
| 4-N(CH$_3$)$_2$ | 6-deoxy-6-demethyltetracycline. |
| 4-N(CH$_3$)$_2$, 6-OH, 6-CH$_3$, 7-Br | 7-bromtetracycline. |
| 4-N(CH$_3$)$_2$, 6-OH, 7-Cl | 6-demethyl-7-chlortetracycline. |
| 6-OH, 6-CH$_3$ | 4-desdimethylaminotetracycline. |
| 6-OH, 6-CH$_3$, 7-Cl | 4-desdimethylamino-7-chlortetracycline. |

Heretofore, the only structural variants having activity comparable to that of tetracycline itself and bearing substituents in the D-ring are those containing either a chlorine atom or bromine atom in the 7-position. It is an object of the present invention to provide novel tetracycline antibiotics having other functional groups in the D-ring which, by virtue of such substitution, have novel antibiotic, pharmaceutical, and physiological properties, and which are themselves useful intermediates for transformation into additional biologically active materials. Other objects of the invention will be apparent to those skilled in the art from the description which follows.

It has been found that the metal salts or free-base forms of the above tetracycline antibiotics, the 11–12 enolic enamines, ethers, and N$^4$-benzyl betaines thereof and 11a-halides of the acid-stable tetracyclines undergo reaction in aqueous solution with aromatic diazonium salts having from 6 to 12 carbon atoms to provide coupling products. The coupling products are typically orange to brown amorphous solids, many of which are water insoluble at a neutral pH. Spectral examination indicates that the amorphous materials obtained are sometimes mixtures of products resulting from coupling at the 7 or 9 positions in the D-ring or at the 11a-position. The products resulting from coupling at the 11a-position are undesired by-products for the present purpose although they too are useful intermediates for other synthesis. Simultaneous rupture of the 11a–12 bond is thought to occur in the course of this side reaction resulting in gross changes in the tetracycline molecule.

It has been found that the undesired 11a-coupling B-ring rupturing side reaction can be prevented by replacing the enolic hydrogen atom at this position with a blocking group. This is readily accomplished by esterification of the enolic hydroxyl in the 11 or 12-position, transformation thereof to a so-called enamine, or 11a-halogenation. It is not known whether the blocking group in the ethers and enamines becomes attached to the 11 or the 12 oxygen atom due to the tautomeric relationship between the groups. For this reason, the ethers and enamines referred to herein are described as 11–12 enolic ethers and enamines. The essential feature of these derivatives, however, is that the mobile hydrogen atom associated with the 11,11a and 12-positions is removed. This system is illustrated in the following formulas.

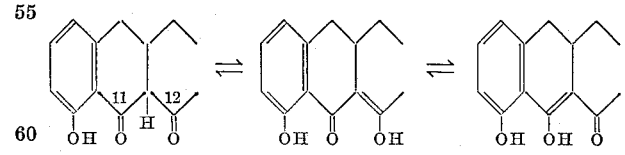

It is desirable to employ as a blocking group a substituent which can be removed after the desired transformations on the rest of the molecule have been completed. For the acid sensitive members of the tetracycline series, that is those substances containing a methyl group and a hydroxyl group at the 6-position typified by tetracycline, 7-chlortetracycline, and 5-hydroxytetracycline, this group is preferably a benzyl group, which is readily removable by hydrogenolysis. For the acid stable members of the series, that is those tetracyclines having one or two hydrogen atoms at the 6-position typified by 6-deoxytetracycline, 6-demethyl-7-chlortetracycline, and 6-deoxy-6-demethyltetracycline, variation as to the nature of the blocking group is permissible since the end products can be subjected to relatively strong acid hydrolysis for removal of the blocking group without effecting further undesired transformations. In addition to the benzyl group, lower alkyl ethers can be employed as well as the 11a-halides and 11–12 enolic enamines thereof of ammonia and primary amines having up to eight carbon atoms, e.g., benzylamine, lower alkenyl, lower alkyl and cycloalkylamines. Benzylamine, allylamine, ethylamine, butylamine, 2-ethylhexylamine, and cyclohexylamine are exemplary of amines useful in forming the 11–12 enolic enamines. The 11a-halides, 11–12 enolic enamines and the tertiary butyl ethers are preferred intermediates due to the comparative ease with which they are cleaved, the former preferably by hydrogenation and the latter two by acid hydrolysis to regenerate the tautomeric 11–12 enol system characteristic of the tetracyclines. Convention methods for the preparation of enamines are applicable to the preparation of these 11, 12-enolic derivatives in the 6-deoxy and 6-demethyl-tetracycline series. The general procedure comprises reacting the tetracycline antibiotic with the desired amine in a suitable solvent, e.g. benzene, toluene, under anhydrous conditions. Alternatively, an excess of the amine component is used as solvent. The temperature of the reaction depends upon the amine component, the thermal stability of the tetracycline component and the solvent. In general, however, temperatures of from about room temperature to about 850° C. are favored. The reaction is conducted at atmospheric pressure except that when a volatile amine component e.g., ethylamine, is used, reaction is advantageously conducted in a closed tube. This procedure is especially favored when a volatile amine is used as reactant and solvent. The method of preparing 11a-halotetracyclines is described in U.S. Patent 3,043,875 and is set forth in working examples appearing hereinafter. The 11a-halides react smoothly with production of improved yields of the desired products.

For the formation of the lower alkyl and benzyl 11–12 enolic ethers, special procedures are required since the common etherifying reagents such as the alkyl halides and sulfates attack the 4-dimethylamino group of the antibiotic.

Mono or poly ethers can be employed so long as the 11, 12 enolic system is etherified. The procedure described for the methylation of 5-hydroxytetracycline in the Journal of the American Chemical Society, vol. 75, pages 54–67 (1953), is widely applicable. This produces a dimethyl ether in which one of the methyl groups is attached to either the 11 or 12 enolic hydroxyl and the other to one of the remaining hydroxyl groups of the A, B or C rings. The phenolic $C_{10}$ hydroxyl group remains unetherified. This is desirable since the free phenolic compounds couple much more readily with diazonium salts than do the $C_{10}$ ethers. Coupling products of the latter may, however, be prepared provided a highly active diazonium salt coupling agent is employed.

When employing an alkyl halide or sulfate in the preparation of the ethers, as is sometimes necessary in preparing the alkyl and benzyl ethers, a useful method of circumventing reaction at the 4-dimethylamino group is to employ the $N^4$-benzyl betaine of the tetracycline antibiotic. They are prepared by treatment of the antibiotic in an inert organic solvent with an equivalent of a benzyl halide in the presence of a neutral acid scavenger such as propylene oxide or ethylene oxide. The resulting $N^4$-benzyl betaine can then be etherified in conventional fashion, and if desired, the $N^4$-benzyl group then removed by hydrogenation either before or after diazo coupling and further transformation of the intermediate aromatic azo compound.

The D-ring substituted aromatic azo tetracycline compounds of the present invention have the following structural formulas.

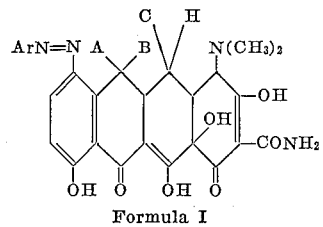

Formula I

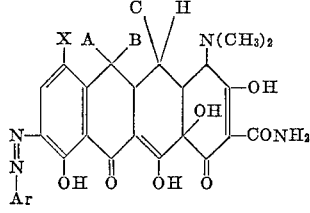

Formula II

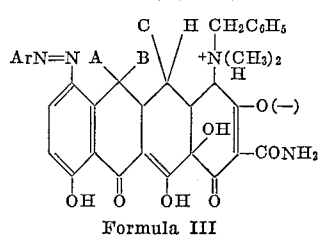

Formula III

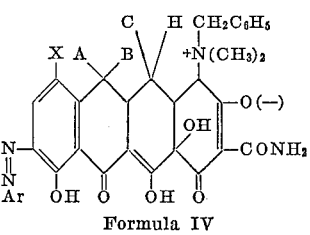

Formula IV

In these formulas, A, B, C, Ar and X have the following meanings:

A is H or $CH_3$

B and C, are each H or OH, but when C is OH, A is $CH_3$

X is halogen

Ar is the organic residue of an aromatic diazonium salt having 6 to 12 carbon atoms.

Also included within the scope of the present invention are the acid addition and metal salts of these substances as well as the 11–12 enolic ethers and enamines and the 11a-halides thereof as already described.

Paper chromatography has been of little value in characterizing the unique products of this invention. The following solvent systems have been tested, and in each instance the product follows the solvent front: 1:1 benzene:chloroform saturated with water; 20:3 toluene:pyridine saturated with pH 4.2 buffer; 20:10:3 nitromethane:chloroform:pyridine and ethyl acetate saturated with water.

The present aromatic azo compounds are prepared by diazonium coupling employing an essentially aqueous system. That is, employing water or up to a 50% aqueous solution of a water soluble lower alkanol or ketone. However, acidic systems (pH 1.5–7) are sometimes preferred, despite the relatively slow reaction rate, since D-ring coupling seems to occur more selectively. In the pH 8–10 range the tetracycline antibiotic is present as a salt of the base employed—usually potassium or sodium hydroxide, but other bases including ammonia and amines are operable. From one to three molecular proportions of the aryl diazonium salt relative to the tetracycline reactant are employed. The proportion of diazonium salt is adjusted to provide the maximum yield of coupling product. The excess over one molecular proportion employed is dictated by the rate of coupling as opposed to the rate of decomposition of the diazonium salt as is customary with diazonium coupling reactions. For example, the reaction between benzene diazonium chloride and tetracycline is relatively slow and a three molar proportion of diazonium salt is found to produce a higher yield of coupling product. The 6-demethyl and 6-deoxytetracycline antibiotic couple more readily and a lesser proportion of diazonium salt is employed.

A reaction temperature of 0–10° C. is recommended. This is dictated chiefly by the stability of the diazonium salt. With exceptionally stable aryl diazonium salts, reaction temperatures of up to 50° C. are sometimes applicable. At temperatures above 50° C. the stability of the antibiotic component becomes a factor.

The tetracycline antibiotic coupling product usually commences to precipitate from the reaction mixture after approximately 15 minutes, but reaction times of the order of two hours are ordinarily employed to ensure completion of the reaction. In many cases, the product separates as an amorphous solid which is collected, washed and dried. If precipitation does not occur, the coupling product may be recovered by solvent extraction, for instance, with n-butanol, methylisobutylketone, etc. The azo compounds thus obtained are suitable for use in further chemical transformation without purification, or they can be purified by reprecipitation or crystallization from solvents, chromatography, solvent extraction techniques involving distribution between immiscible solvents, etc.

The aryl diazonium salts which provide coupling products of the present type are myriad. Generally speaking, any diazotizable primary aromatic amine can be employed as starting material. Steric considerations, however, are involved and application of the process is largely limited to primary aromatic amines containing from 6 to 12 carbon atoms. It is presumed that the increased facility with which the 6-deoxy and 6-demethyl compounds react is due in part to the reduced steric hinderance of the more reactive 7-position in the D-ring.

The term, "diazotizable aromatic primary amine" is intended to relate to aromatic primary amines of the aniline, α-naphthylamine, and β-naphthylamine series which are known to form diazonium salts on reaction with nitrous acid. Extensive prior art on the subject of diazotizing primary aromatic amines exists in connection with the chemistry of the azo dyes. In many instances, special techniques for the preparation of the diazonium salts, well-known to those skilled in the art, are required when certain other functional groups are also attached to the aromatic nucleus of the primary amine. Thus, dinitroaniline is diazotized in concentrated sulfuric acid solution rather than in aqueous solution. Primary aromatic amines also containing secondary amino groups such as p-aminodiphenyl-amine or monoethyl-p-phenylenediamine, require the use of two moles of nitrite, one to form the diazonium salt of the primary amino group and the other to nitrosate the secondary amino group. The nitroso group can be subsequently removed, if desired, by hydrolysis with acid or base or treatment with reducing agents such as bisulfite. Details relating to the preparation of such diazonium salts are not considered part of the present invention and are adequately summarized in a number of standard reference works such as "Fundamental Processes of Dye Chemistry," by H. E. Fierz-David and L. Blangey, Interscience Publishers, New York, New York (1949), pp. 241–249, and "ACS Monograph Series No. 127 The Chemistry of Synthetic Dyes," Rheinhold Publishing Corporation, New York (1955), pp. 96–109.

Generally speaking, it is preferred to employ an aryl diazonium salt which is a so-called strong coupler in preparing the present azo compounds. The strong couplers are comprised of the diazonium salts containing an electron-withdrawing substituent such as a nitro, cyanato, sulfo, cyano, carboxy, thiocyanato, or halo group, attached to the aromatic nucleus containing the diazonium function. Examples of diazotizable primary aromatic amines which provide tetracycline antibiotic D-ring aromatic azo compounds are: aniline, p-chloroaniline, p-bromoaniline, 2,5-dichloroaniline, 2,5-dibromoaniline, o-anisidine, p-anisidine, sulfanilic acid, β-naphthylamine, benzidine, aceto-p-phenylenediamine, p-aminoazobenzene, α-naphthylamine, p-nitroaniline, o-nitroaniline, 3-nitro-4-toluidine, 2-nitro-4-chloroaniline, and 2,4-dinitroaniline.

Use can be made of the metal chelates of the tetracycline antibiotic reactants such as the magnesium, barium, calcium, zinc, or copper complexes in the present diazonium coupling reaction. However, this frequently offers little advantage. Use of the metal chelates, unfortunately, does not seem to reduce the tendency for coupling to occur at the 11a-position in many cases. To this end, it is preferable to use the 11–12 enolic ethers, or the $N^4$-benzyl betaines thereof, the 11a-halides and the 11–12 enolic enamines as has been explained above. These compounds lack an active hydrogen atom at the 11a-position.

A key step in the use of the present tetracycline antibiotic D-ring aromatic azo compounds in the preparation of novel biologically active D-ring substituted tetracyclines is hydrogenolysis of the aryl azo group to an amino group to produce a 7-aminotetracycline or a 9-aminotetracycline. This transformation can be carried out by electrolytic or chemical methods, but catalytic hydrogenolysis is preferred. Chemical methods employing for example, reagents like stannous chloride are complicated in some cases by the formation of antibiotic complexes with the metals making up the reducing system, and by degradation of the antibiotic coupling product under the strongly acid or alkaline conditions necessary. This is not usually a problem, however with those tetracyclines having at least one hydrogen atom in the 6-position. These substances are stable under strongly acid and alkaline conditions. Metal complexes of these substances when formed can therefore be decomposed, without injuring the antibiotic component, by treatment with aqueous acid.

Catalytic hydrogenolysis has the advantage of being universally applicable throughout the series and of permitting a variety of selective hydrogenations depending upon reaction conditions and the use of controlled amounts of hydrogen. Thus, by hydrogenolysis of an aryl azo compound of a benzyl ether of chlortetracycline, in addition to hydrogenolysis of the benzyl and the aryl azo groups, the 7-halogen or both the 7-halogen and 6-hydroxyl groups can be removed to provide, for instance, 9-amino-6-deoxytetracycline. The 11a-halogen may also be removed and, if desired, in preference to the 7-halogen. The 11a-chloro, bromo and iodo groups are, relative to the 11a-fluoro group, easily removed by hydrogenolysis or chemically as described in United States Patent No. 3,043,875 and as exemplified below.

By proper selection of starting materials, it is thus possible to prepare both the 7-amino and 9-amino derivatives of tetracycline and the 6-deoxy, 6-demethyl, 6-deoxy-6-demethyl, and 4-desdimethylamino analogs thereof. Similarly, 7-amino and 9-amino-5-hydroxytetracycline can be prepared as well as the 6-deoxy and 4-desdimethylamino analogs.

The hydrogenolysis is most advantageously accomplished in the presence of at least ½₀ part by weight of a noble metal catalyst and sufficient hydrogen to provide at least two molecular proportions thereof per arylazo grouping to be reduced. Massive amounts of catalyst, i.e., up to an equal part by weight as compared to tetracycline antibiotic-arylazo substrate, can be employed, not infrequently to advantage. If other reducible groupings are to be acted upon, such as the 7-halogen, 11a-halogen, or 6-hydroxyl, additional hydrogen must be provided. Temperatures from about 20 to 50° C. are ordinarily preferred. Suitable catalysts include Raney nickel, metallic, platinum, rhodium, ruthenium, rhenium and palladium, prepared in situ, if desired, by reduction of a salt or oxide thereof. Catalytic compounds of these metals are also useful. Supported noble metal catalysts such as 5% palladium-on-carbon, platinum-on-kieselguhr, etc. are commonly used. The proportion of catalyst specified refers to the total catalyst weight in the case of supported catalysts and catalytic compounds, and not to the metal content thereof.

The resulting 7- and 9-aminotetracyclines are subject to further transformation according to methods known to be applicable to tetracycline itself including the formation of the 4a,12a-, and 5a,6-anhydro compounds, removal of the 12a-hydroxyl group, alkylation of the 6-demethyl and 6-deoxy members in the D-ring or when operating on the 2-decarboxamido-2-nitriles, on the carboxamide nitrogen. Esters, substituted O-carbamates, sulfuric acid esters of the compounds containing a 5-hydroxyl group etc. can also be prepared by conventional methods.

The D-ring primary amino derivatives of the tetracycline antibiotics obtained by reduction of the aromatic azo compounds of this invention as described above have the following formulas. These substances and their acid addition and metal salts, are also considered part of the present invention.

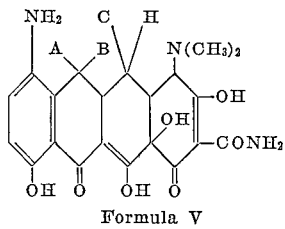

Formula V

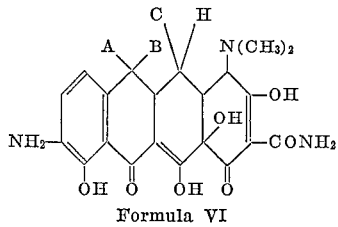

Formula VI

In these formulas, A, B and C have the same meanings as has been indicated for Formulas I, II, III and IV. The acid stable compounds of Formula V also serve as intermediates for the preparation of the corresponding compounds of Formula VI since they are converted to the corresponding 7-halotetracyclines which serve as starting compounds for the preparation of Formula VI compounds.

The acylation of amino compounds of structures V and VI is accomplished by the usual methods recognized by those in the art. Since hydroxy groups are also present procedures which favor N-acylation are desirable to obtain pure products. A preferred method involves acylation in an alcohol solution with the desired acid anhydride, or obvious equivalent, such as, the acid chloride in a reaction-inert solvent. A particularly useful formylating agent is acetoformic acid which is prepared by mixing 1 volume of 100% formic acid and two volumes of acetic anhydride. Any O,N-diformyl by-product may be removed by simple treatment of the product with water. A volume of 72 ml. of this reagent provides one equivalent of this reagent. Acyl groups containing from 1 to 4 carbon atoms are favored in view of their ease of preparation. However, larger acyl groups can also be prepared to give products of enhanced lipid solubility relative to that of the lower acyl derivatives.

These substances are useful antibiotics themselves. The acid stable amino compounds are exceedingly valuable intermediates since diazotization thereof and replacement of the diazonium group, by conventional methods for the replacement of that group in simpler compounds, makes possible the preparation of a large number of novel materials. The replacement of the aromatic diazonium group with other functional substituents is described in the art.

The acid stable 6-demethyl, 6-deoxy, and 6-demethyl-6-deoxy members are particularly well suited for this type of process since acidic reaction conditions are frequently required. By means of such methods, the following substituents are introduced into the D-ring of the 6-deoxy, 6-demethyl, and 6-deoxy-6-demethyltetracyclines: F, Cl, Br, I, CN, OCN, SCN, $NO_2$, $AsO_3H_2$, $N_3$, SH, and SR wherein R is a hydrocarbon group having up to 10 carbon atoms. These compounds have the following structure in which Z and $Z_1$ stand for the D-ring substituent introduced.

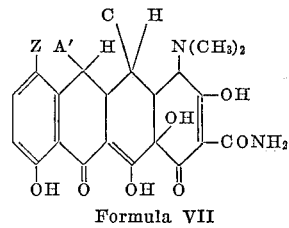

Formula VII

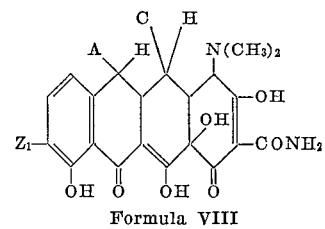

Formula VIII

C has the same meaning as indicated for Formulas I through VI and A' is selected from the group consisting of hydrogen, hydroxy and methyl.

To illustrate, treatment of a diazotized D-ring aminotetracycline antibiotic of Formula VIII wherein $Z_1$ is the diazonium group, with a boiling mineral acid solution of potassium iodide results in the introduction of an iodine atom into the D-ring. 9-iodo-6-deoxytetracycline can thus be prepared from 9-amino-6-deoxytetracycline. 9-bromo-6-deoxy-5-oxytetracycline is obtained in analogous fashion by treatment of diazotized 9-amino-6-deoxy-5-oxytetracycline with cuprous bromide.

7-chloro-6-deoxytetracycline is prepared in a similar manner. Similarly, coupling of 6-demethyl-7-chlortetracycline or a suitable 11a-protected derivative thereof with m- or p-nitrobenzenediazonium chloride produces the corresponding 9-p-nitrophenylazo compound. This is then reduced in similar fashion resulting in loss of the chlorine atom and the 6-hydroxyl with the formation of 9-amino-6-deoxy-6-demethyltetracycline. This is then diazotized, and the diazonium group replaced with a further substituent, for instance a fluorine atom to provide 9-fluoro-6-deoxy-6-demethyltetracycline. Coupling of 7-chlortetracycline, or an appropriate derivative thereof, with benzenediazonium chloride followed by hydrogenation, etc. under basic conditions, e.g., in the presence of triethylamine, yields 9-aminotetracycline.

The same papergram systems are applicable to the identification of the D-ring halogenated 6-deoxytetracyclines of the present invention as are employed for the identification of 6-deoxytetracycline itself. Thus, 9-bromo-6-deoxy-6-demethyltetracycline exhibits $R_f$ values of 0.62 and 0.75 in the solvent systems 20:3 toluene: pyridine saturated with pH 4.2 buffer; and ethyl acetate saturated with water, respectively. The halogenated compounds are, of course, less polar than their deoxy and demethyltetracycline counterparts and thus move closer to the solvent front when the less polar solvent component is used for development of the papergram as is the usual case.

The D-ring halogenated products of the present invention are substantially more stable than prior halogenated tetracyclines. They produce more prolonged antibiotic blood levels in animals than do the parent tetracycline antibiotics. They are also active against strains of bacteria, particularly staphylococci, which are resistant to the earlier tetracyclines.

Examples illustrating the replacement of the D-ring amino group of the 6-deoxy, 6-dimethyl, and 6-deoxy-6-demethyl aminotetracyclines of the present invention by substituents such as F, I, CN, OCN, SCN, $NO_2$, $ASO_3H_2$, $N_3$, SH, and alkyl and aryl mercapto (SR) appear hereinafter.

Alternatively, the nitro compounds, that is the 7- and 9-nitro tetracyclines and their 11a-halo derivatives having at least one H atom in the 6-position can also be prepared by direct nitration. A mixture of the 7 and 9 isomers is ordinarily obtained when employing aqueous nitric and sulfuric acids as the nitrating agent. The mixture of isomers so obtained can frequently be separated by fractional crystallization since the isomers sometimes have different solubilities in polar solvents such as the alkanols and aqueous alkanols.

The 7-nitrotetracyclines of the present invention are exceedingly active antimicrobial agents. In fact, 7-nitro-6-deoxy-6-demethyltetracycline is more active against many organisms in vitro than any of the tetracycline antibiotics yet prepared. It has an in vitro bioassay (*K. pneumoniae*) of 4,100 tetracycline units per milligram. That is, it is four times more active than tetracycline itself and twice as active as 7-chlortetracycline. The 9-nitro compounds, by contrast, have comparatively low in vitro antibacterial activity. It is thought that this may be the result of hydrogen bonding between the $C_{10}$ hydroxyl and the 9-nitro group.

The direct nitration as described above appears to favor substitution at the 9-position since that isomer appears to be produced in preponderant amount, particularly in those instances in which a 6-methyl group is present as in 6-deoxytetracycline. The 6-methyl group appears to sterically hinder nitration at the 7-position.

The 9-aminotetracyclines of this invention exhibit greater in vitro and in vivo activity than do the 7-aminotetracyclines. The 9-amino-6-deoxy-6-demethyltetracycline has an oral $PD_{50}$ against *Staphylococcus aureus 5* of 1.00 mg./kg. and a parenteral $PD_{50}$ of 0.35 mg./kg. whereas the corresponding 7-amino compound has oral and parenteral $PD_{50}$ values of 20 and 3 mg./kg. tetracycline under similar conditions has oral and parenteral $PD_{50}$ values of 5.40 and 1.00 mg./kg.

The diazonium coupling process of the present invention has the advantage of favoring substitution at the 7-position regardless of whether a 6-methyl group is present. Therefore, the problem and added expense of separating mixtures of isomers, with the resulting reduction in yield, is avoided by the present diazonium coupling, hydrogenation, diazotization and replacement process sequence of the present invention.

Production of $C_9$-derivatives by direct nitration or by the diazonium coupling process is preferably accomplished by employing a tetracycline substituted in the 7-position by a readily removable group, such as, a chloro group. Hydrogenolysis of the nitro or aryl azo group alone or of the nitro or aryl azo group and the 7-chloro group is possible under proper conditions as noted above. Further, when a 7,11a-dihalo tetracycline is coupled according to this process, hydrogenolysis of the aryl azo group alone or of the aryl azo group and the 7- and/or 11a-halo groups can be effected under proper conditions as described herein.

Reduction of the nitro derivatives of the 7,11a-dihalo tetracyclines of the 11a-halotetracyclines by chemical means other than catalytic hydrogenolysis, e.g., with sodium hydrosulfite or zinc acetic acid, simultaneously removes the 11a-chloro group. The 11a-fluoro group on the other hand may be largely retained under such treatment.

The present new D-ring substituted tetracycline compounds may be formulated into various compositions analogous to the parent tetracyclines from which they are derived. They are useful therapeutically in feeds or as growth stimulants, in veterinary practice and in agriculture.

For human therapy, the usual oral dosage of the present new compounds is from about 0.1 to about 2 g. per day for the average adult. The product is formulated into capsules or tablets containing from 25 to 250 mg. of antibiotic on an activity basis. Suspensions or solutions in various vehicles are prepared using concentrations ranging from 5 to 125 mg./ml. For parenteral administration intramuscularly or intravenously, the daily dose is reduced to about .05 to 1.0 g. Intramuscular formulations comprise solutions of the antibiotic at concentrations ranging from 50 to 100 mg./ml. Intravenous administration is by means of isotonic solutions having antibiotic concentration of about 10 mg./ml. Both types of parenteral products are conveniently distributed as solid compositions for reconstitution. These products may also be used for topical applications in the usual extending media. In all instances, of course, the attending physician will indicate the dosage to fit the needs of a particular patient. For children, smaller doses are generally used.

The present invention embraces all salts, including acid-addition and metal salts, of the newly recognized amphoteric antibiotics. The well known procedures for preparing salts of tetracycline compounds are applicable here and are illustrated by examples appearing hereinafter. Such salts may be formed with both pharmaceutically acceptable and pharmaceutically unacceptable acids and metals. By "pharmaceutically acceptable" is meant those salt-forming acids and metals which do not substantially increase the toxicity of the amphoteric antimicrobial agent. The preferred salts are the acid addition salts and pharmaceutically acceptable metal salts.

The pharmaceutically acceptable acid addition salts are of particular value in therapy. These include salts of mineral acids such as hydrochloric, hydriodic, hydrobromic, phosphoric, metaphosphoric, nitric and sulfuric acids, as well as salts of organic acids such as tartaric, acetic, citric, malic, benzoic, glycollic, gluconic, gulonic, succinic, arylsulfonic, e.g., p-toluenesulfonic acids, and the like. The pharmaceutically unacceptable acid addition salts, while not useful for therapy, are valuable for isolation and purification of the newly recognized antibiotic. Further, they are useful for the preparation of pharmaceutically acceptable salts. Of this group, the more common salts include those formed with hydrofluoric and perchloric acids. Hydrofluoride salts are particularly useful for the preparation of the pharmaceutically acceptable salts, e.g., the hydrochloride, by solution in hydrochloric acid and crystallization of the hydrochloride salt formed. The perchloric acid salts are useful for purification and crystallization of the new antibiotic.

Whereas all metal salts may be prepared and are useful for various purposes, the pharmaceutically acceptable metal salts are particularly valuable because of their utility in therapy. The pharmaceutically acceptable metals include more commonly sodium, potassium and alkaline earth metals of atomic number up to and including 20, i.e., magnesium and calcium, and additionally, aluminum, zinc, iron and manganese, among others. Of course, the metal salts include complex salts, i.e., metal chelates, which are well recognized in the tetracycline art. The pharmaceutically unacceptable metal salts embrace most commonly salts of lithium and of alkaline earth metals of atomic number greater than 20, i.e., barium and strontium, which are useful for isolation and purifying the antibiotic. Since the new antibiotic is amphoteric, it also forms salts with amines of sufficient basicity.

It will be obvious that, in addition to their value in therapy, the pharmaceutically acceptable acid and metal salts are also useful in isolation and purification.

The following examples are given by way of illustration and are not to be construed as limitations of this invention, many variations of which are possible within the scope and spirit thereof.

*Example I.—7-phenylazotetracycline*

One molecular proportion of aniline is dissolved in 2 N HCl, employing about 20 ml. thereof per gram of aniline, and the solution treated with one molecular proportion of sodium nitrite at a temperature of 0 to 10° C. The resulting benzene diazonium chloride solution, is then mixed at 0 to 20° C. with an aqueous solution of one molecular proportion of tetracycline base and an equivalent quantity of sodium hydroxide, and containing sufficient sodium carbonate to neutralize the excess HCl in the diazotized aniline solution. The pH of the solution is in the range 8–10. Stirring is continued at 0° C. for approximately two hours during which time the crude 7-phenylazotetracycline separates. The product is collected on a filter, washed, and dried. This material exhibits ultra-violet absorption maxima when dissolved in 0.01 N methanolic hydrochloric acid at 255 and 435 m$\mu$ with shoulders at 375 m$\mu$ and 540 m$\mu$. On boiling the acid solution, the absorption changes to 240, 375 and 530 m$\mu$ with a shoulder at 300 m$\mu$.

*Example II.—7-phenylazo-5-hydroxytetracycline dimethyl ether*

The procedure of Example I is repeated employing oxytetracycline dimethyl ether and three molecular proportions of aniline. The resulting coupling product exhibits absorption maxima in the ultra-violet at 260, 355, and 455 m$\mu$.

*Example III.—Phenyl-substituted 7-phenylazotetracyclines*

The procedure of Example I is repeated substituting the following amines for aniline: p-chloroaniline, p-bromoaniline, 2,5-dichloroaniline, 2,5-dibromoaniline, o-anisidine, p-anisidine, sulfanilic acid, $\beta$-naphthylamine, benzidine, aceto-p-phenylenediamine, aminoazobenzene, $\alpha$-naphthylamine, p-nitroaniline, o-nitroaniline, 3-nitro-4-toluidine, 2-nitro-4-chloroaniline, and 2,4-dinitroaniline to produce the corresponding aromatic azo D-ring substituted tetracycline compound with results comparable to Example I.

*Example IV.—7- and 9-phenylazo substituted tetracycline analogs*

The procedure of Example I is repeated with comparable results substituting the following for tetracycline: 6-demethyltetracycline, 6-deoxy-5-hydroxytetracycline, 7-bromo-, 7-fluoro-, 7-iodo- and 7-chlortetracycline, 5-hydroxytetracycline, 6-deoxy-7-chloro-5-hydroxytetracycline, 6-demethyl-7-bromtetracycline, 6-deoxy-6-demethyltetracycline, 4-desdimethylamino-5-oxytetracycline, 6-demethyl-7-chlortetracycline, 4-desdimethylaminotetracycline, 4-desdimethylamino-7-chlortetracycline, 4-desdimethylamino-6-deoxy-6-demethyltetracycline, 7-bromo- and 7-iodo-5-hydroxytetracycline.

*Example V.—N⁴-benzyl-6-deoxytetracycline betaine*

A solution of one part by weight of 6-deoxytetracycline hydrochloride, five parts by weight of benzyl bromide, and five parts by weight of propylene oxide in 20 parts by weight of acetone is refluxed for 4 hours. A calcium chloride drying tube is employed to exclude atmospheric moisture from the system. The propylene oxide is employed to act as a neutral acid scavenger to promote formation of the N⁴-benzyl-6-deoxytetracycline betaine. The mixture is cooled to room temperature and the benzyl betaine precipitated by treatment of the solution with ether and hexane. Alternatively the betaine can be recovered by evaporation of the acetone from the reaction mixture and extraction of the residue with an ether-hexane solvent mixture. The benzyl betaine is insoluble in the solvent mixture. The benzyl betaine is characterized by microanalysis indicating the composition $C_{29}H_{30}N_2O_7$, and ultra-violet absorption maximum at about 349 m$\mu$ when dissolved in 0.01 N HCl in methanol. N⁴-benzyl-6-deoxytetracycline betaine is essentially inactive in the K. pneumoniae in vitro assay commonly employed for the tetracycline antibiotics.

*Example VI.—N⁴-benzyl-6-demethyl-7-chlortetracycline betaine*

The process of Example V is repeated employing alternatively 6-demethyl-7-chlortetracycline hydrochloride as the starting material to provide in comparable manner N⁴-benzyl-6-demethyl-7-chlortetracycline betaine which product is also substantially inactive according to the K. pneumoniae assay.

*Example VII.—N⁴-benzyl-6-deoxytetracycline betaine 11, 12-enolic monomethyl ether and 6-demethyl homolog thereof*

The betaine of Example V, 20 g. is dissolved in 400 ml. of dry dioxane and treated with 2 g. of diazomethane in 100 ml. of anhydrous ether at 10° C. When nitrogen evolution ceases, the solution is evaporated to dryness in vacuo. The residual N⁴-benzyl-6-deoxytetracycline betaine monomethyl ether is triturated with hexane and collected on a filter. It is characterized by a terminal ultra-violet absorption maximum at about 352 m$\mu$, and a methoxy content, determined by analysis, corresponding to one $CH_3O$-ether group per mole. The monoethyl ether of N⁴-benzyl-6-demethyl-7-chlortetracycline betaine is prepared in an analogous fashion with comparable results. It is not clear whether the single ether group is located in the 11 or the 12 position due to the tautomeric relationship between these hydroxyl groups in the parent materials.

*Example VIII.—7-phenylazo-N⁴-benzyl-6-deoxytetracycline monomethyl ether*

The procedure of Example I is repeated employing in place of tetracycline base, N⁴-benzyl-6-deoxytetracycline betaine monomethyl ether and 1.2 moles of aniline. A higher yield of coupling product is obtained than when tetracycline antibiotic base is used in the process. Coupling appears to occur principally in the 7-position.

*Example IX.—9-phenylazo-N⁴-benzyl-6-demethyl-7-chlortetracycline monomethyl ether*

N⁴-benzyl-6-demethyl-7-chlortetracycline monomethyl ether (Example VII) is coupled with benzene diazonium chloride using the procedure of Example I. Selective D-ring coupling with the exclusion of coupling at 11a appears to result. Coupling occurs primarily in the 9-position since the 7-position is occupied by a chlorine atom.

*Example X.—7-amino-6-deoxytetracycline*

One part by weight of the product of Example VIII is mixed with 20 parts by weight of methanol (other lower alkanols containing up to about 4 carbon atoms can be employed) and ⅕ part by weight of 5% palladium-on-carbon hydrogenation catalyst is added to the mixture. The mixture is then hydrogenated at 30–45 p.s.i. in a conventional apparatus at 30° C. until three molecular proportions of hydrogen has reacted. The catalyst is then filtered, and the filtrate evaporated to dryness. The residue comprises a mixture of aniline and 7-amino-6- deoxytetracycline monomethyl ether. Hydrogenolysis in this fashion not only results in transformation of the aromatic azo substituent into the amino group, but also cleaves the $N^4$-benzyl group thus disrupting the betaine function. The aniline is removed from the crude product by washing with ether yielding an ether-insoluble cake of 7-amino-6-deoxytetracycline monomethyl ether. This product is then dissolved in 6 N $H_2SO_4$ and warmed on the steam bath for one hour. The excess sulfuric acid is neutralized by adjusting to pH 1.5 with sodium hydroxide. 7-amino-6-deoxytetracycline sulfate is isolated by exhaustive extraction of the cooled solution with n-butanol. The product precipitates on concentration of the extracts.

The amphoteric form of 7-amino-6-deoxytetracycline crystallizes on adjusting an aqueous solution of the sulfate to pH 5.5.

*Example XI.—9-amino-6-deoxy-6-demethyltetracycline*

The procedure of Example X is repeated employing the benzene diazonium chloride $N^4$-benzyl - 6 - demethyl-7-chlortetracycline betaine monomethyl ether coupling product of Example IX as starting material, using platinum oxide as the catalyst, and ethanol as solvent. 9-amino-6-demethyl - 6 - deoxytetracycline monomethyl ether is obtained and hydrolyzed in analogous fashion. The amphoteric form of 9-amino-6-demethyl-6-deoxytetracycline is obtained by adjusting the hydrolysis mixture to pH 5.5. Recovery of this product as the magnesium salt occurs if an equivalent of magnesium chloride is added before neutralization to pH 5.5.

*Example XII.—$N^4$-Benzyltetracycline betaine monobenzyl ether*

The $N^4$-benzylbetaine of tetracycline is prepared by direct adaptation of the procedure of Example V for the $N^4$-benzylation of 6-deoxytetracycline analog. This product is then dissolved in a convenient quantity of ethanol in which one equivalent of sodium has been previously dissolved. The mixture is then treated with benzyl bromide in dropwise fashion while maintaining the temperature at 20–25° C. by external cooling. The solvent is then evaporated in vacuo and the residue washed with water to remove sodium bromide and other water soluble impurities.

*Example XIII.—7-aminotetracycline*

$N^4$-benzyltetracycline betaine monobenzyl ether is coupled with benzene diazonium chloride by the method described in Example I. The resulting 7-phenylazo-$N^4$-benzyltetracycline monobenzyl ether is then hydrogenated as described in Example X, four molecular proportions of hydrogen being absorbed. Amphoteric 7-aminotetracycline is then recovered by evaporation of the solvent and washing the residue with ether. This is readily converted to various acid addition salts by treatment with various acids. 7-aminotetracycline is a diacidic base and, therefore, forms both mono and disalts such as the monohydrochloride, dihydrochloride, acid sulfate, sulfate, mononitrate, dinitrate, mono-p-toluenesulfonate, succinate, hemisuccinate, etc.

*Example XIV.—9-fluoro-6-deoxytetracycline*

9-amino-6-deoxytetracycline, 7 g., is dissolved in 160 ml. of 2 N hydrochloric acid and treated with a 20% aqueous sodium nitrate solution at 0–5° C. When a positive test with starch-iodide test paper with a few drops of the reaction mixture is obtained indicating the presence of excessive nitrite ion, the addition of sodium nitrite is stopped. A 40% solution of fluoboric acid, 220 g., is added rapidly to the diazonium salt solution at 0° C. A thick precipitate forms which is collected on a filter and washed with ice-water, methyl alcohol, and ether in sequence, and then air-dried to provide the diazonium fluoborate salt of the diazotized 9-amino-6-deoxytetracycline.

The diazonium fluoborate is then decomposed by carefully heating with a free flame until decomposition is complete as indicated by the cessation of gas evolution. The residue is then dissolved in water, insoluble material filtered, the aqueous solution decolorized by treatment with decolorizing carbon, and the amphoteric 9-fluoro-6-deoxytetracycline precipitated by neutralization of the mixture with dilute aqueous sodium hydroxide to approximately pH 7.

*Example XV.—Other 7-fluorotetracyclines*

The procedure of Example XIV is applied in analogous fashion to 7-amino-6-demethyl-6-deoxytetracycline, to produce 7 - fluoro - 6-demethyl-6-deoxytetracycline. 7-fluoro-6-deoxy-5-hydroxytetracycline is similarly prepared by treatment of the corresponding 7-aminotetracycline antibiotic in the same fashion.

*Example XVI.—7-cyano-6-deoxy-4-desdimethylaminotetracycline*

7-amino-4-desdimethylamino-6-deoxytetracycline, 4 g., is mixed with 20 ml. of 2 N hydrochloric acid and treated with 20% aqueous sodium nitrite until a positive starch iodide test is obtained indicating an excess of nitrite ion. This process is carried out at a temperature of 0°–5° C. The solution is then neutralized by the addition of sodium carbonate and added slowly to 0.01 mole of cuprous cyanide in 200 ml. of water. The later is prepared by treating a solution of 2.5 g. of $CuSO_4 \cdot 5H_2O$ and 0.65 g. of sodium chloride in 8 ml. of water with 0.53 g. of sodium bisulfite and 0.35 g. of sodium hydroxide in 4 ml. of water. The precipitated cuprous chloride is collected, dissolved in 4 ml. of distilled water, and treated with 0.13 g. of sodium cyanide dissolved in 1 ml. of water.

The temperature of the diazonium salt-cuprous cyanide solution is then kept at 25–30° C. for several hours and finally warmed to about 50° on a water bath. Nitrogen is evolved during the process, and 7-cyano-6-deoxy-4-desdimethyl-aminotetracycline precipitates from the solution.

*Example XVII.—9-thiocyanato-6-demethyltetracycline*

9-amino-6-demethyltetracycline, 4.5 g., is diazotized according to the method employed in Example XVI. The ice cold solution is then mixed with an ice cold solution of potassium thiocyanate, and a paste of cuprous thiocyanate prepared by adding 0.12 g. of potassium thiocyanate to a solution of 2.7 g. of copper sulfate containing 5 g. of ferrous sulfate. Nitrogen is evolved for about three hours with the mixture kept at 0–5° C. The mixture is then allowed to warm to room temperature, filtered, and the 9-thiocyanato-6-demethyltetracycline hydrochloride is extracted from this solution with n-butanol and recovered therefrom by evaporation of the solvent. The amphoteric form is obtained by neutralization of the butanol extract with triethylamine.

*Example XVIII.—7-cyanato-6-demethyltetracycline hydrochloride*

7-amino-6-demethyltetracycline, 4.5 g., is diazotized according to the procedure described in Example XVII and one equivalent of potassium cyanate and one equivalent of copper powder is added to the diazonium solution. Evolution of nitrogen commences at once. When gas evolution becomes sluggish, an additional portion of copper powder is added. Excess copper powder is filtered, the filtrate acidified to pH 1.5 with hydrochloric acid, and 7 - cyanato - 6-demethyltetracycline hydrochloride is recovered by continuous extraction with ethyl acetate.

*Example XIX.—7-nitro-6-demethyl-6-deoxytetracycline sulfate*

7-amino-6-deoxy-6-demethyltetracycline, 4.3 g., is dissolved in 20 ml. of 6 N nitric acid and treated with 7.0 g. of sodium nitrite. The diazonium nitrate solution is then mixed with a suspension of cuprous oxide in water, which is prepared by reducing an aqueous solution of copper sulfate, approximately 5 g. of 50 ml. of water, with an alkaline glucose solution which is subsequently neutralized with acetic acid. A reaction ensues with the evolution of nitrogen. The mixture is strongly acidified to decompose the copper complexes, and the 7-nitro-6-deoxy-6-demethyltetracycline extracted from the solution with methyl isobutylketone.

This substance can also be prepared together with 9-nitro-6-deoxy-6-demethyltetracycline by direct nitration of 6-deoxy-6-demethyltetracycline as follows. One gram of 6-deoxy-6-demethyltetracycline hydrochloride is dissolved in approximately 10 ml. of concentrated sulfuric acid at 0–5° C. and treated with 1.4 ml. of a 10:1 concentrated sulfuric acid 70% nitric acid solution in dropwise fashion with stirring at 0–5° C. during a 15 min. period. The solution is then poured into 400 ml. of anhydrous ether. The nitro-6-deoxy-6-demethyl-tetracyclines precipitate as the acid sulfate salts. The precipitate is collected, washed, and dried. The crude nitration product is crystallized from about 5 ml. of methanol to yield 0.7 g. of a mixture of 7-nitro- and 9-nitro-6-deoxy-6-demethyltetracyclines. The mixture is separated by column partition chromatography using the toluene-pyridine-water system.

The 7-nitro product is the less polar component and is, therefore, first to be eluated. It has in vitro inhibitory activity corresponding to 4100 mcg. of tetracycline per milligram of substance measured by the conventional *K. pneumoniae* bioassay technique. It exhibits ultra-violet absorption maxima in 0.01 N methanolic HCl at 263 and 354 m$\mu$. The acid sulfate salt has infrared absorption bands at the following wave lengths (1% concentration in KBr pellet): 2.95, 3.21, 6.0, 6.18, 6.30, 6.54, 6.80, 7.46, 7.73, 8.20, 8.95 and 9.52$\mu$ Comparison of the half wave potential of this substance with those of o and p-nitrophenol measured with a dropping mercury electrode confirms the location of the nitro group in the 7-position para to the 10-hydroxyl group.

The diazonium replacement method has the advantage of producing only the highly active 7-nitro isomer and thus obviates the separation process outlined.

*Example XX.—7-arsenoxy-6-deoxy-5-hydroxy-tetracycline*

7-amino-6-deoxy-6-hydroxytetracycline 4.6 g., is dissolved in 20 ml. of 2 N hydrochloric acid, solution cooled to 5° C. and treated with 20% aqueous sodium nitrite solution until a positive test with starch-iodide test paper is obtained indicating the presence of excess nitrite. Excess acid is neutralized with sodium carbonate, and a solution of 2 g. of sodium arsenite ($Na_2$-$HAsO_3$) in 10 ml. of water is then added, the mixture is stirred, and 12.5 ml. of 1 N sodium hydroxide is gradually added. The temperature of the solution is maintained at about 10° C. during this operation. The solution is then acidified and amphoteric 7-arsenoxy-6-deoxy-5-hydroxytetracycline is recovered.

This product is conveniently converted to the disodium salt by treatment with one molar proportion of sodium carbonate in water. Other metal salts such as calcium, magnesium, zinc, potassium, lithium and aluminum salts are prepared in analogous fashion.

*Example XXI.—9-triazo-6-demethyltetracycline*

9-amino-6-demethyltetracycline is diazotized as described in Example XIX. A solution of 0.7 g. sodium axide in 5 ml. of water is then added at 0° C. Nitrogen is evolved. The mixture is stirred for a short period of time after nitrogen evolution ceases, and then the mixture is allowed to warm to room temperature. It is adjusted to pH 7 and the resulting 9-triazo-6-demethyltetracycline is recovered.

*Example XXII.—11,12-enolic benzylamino enamine of 6-deoxy-7-chlorotetracycline*

6-deoxy-7-chlorotetracycline base, 5.0 g. and 25 ml. of benzylamine is warmed on a steam bath for approximately 4 hours. The mixture is then cooled, and diluted with about 150 ml. of ether. The amorphous 11,12 enolic enamine precipitates as a taffy-like gum. It solidifies on standing and is collected, and coupled with diazotized p-nitroaniline as described in Example XXIII.

*Example XXIII.—9-(m-Nitrophenylazo)-6-deoxy-7-chlorotetracyline 11,12-enolic benzylamino enamine* m-Nitroaniline, 1.4 g. (0.01 mole), is dissolved in 2.5 ml. of warm water containing 1.3 ml. of concentrated hydrochloric acid and additional 2.5 ml. of hydrochloric acid is then added and the solution rapidly cooled in an ice-salt bath to a temperature of 0 to —10° C. A solution of 0.7 g. of sodium nitrite in 2 ml. of water is then slowly added. Addition of the sodium nitrite solution is stopped when a positive reaction with starch iodide paper is obtained a few minutes after adding the portion of sodium nitrite.

The product of Example XXII, 0.01 mole, is then dissolved in an equivalent quantity of sodium hydroxide sufficient to produce the sodium salt thereof, and this solution mixed with the solution of the m-nitrobenzene diazonium chloride prepared above. Sufficient sodium carbonate is added to adjust the pH to within the range 8–10. The temperature is maintained at 0° C. to 5° C. during the entire operation. The coupling product soon commences to precipitate as an amorphous solid. The mixture is stirred for approximately three hours and then the amorphous solid is collected.

*Example XXIV.—9-amino-7-deoxytetracycline*

One part by weight of platinum oxide is suspended in dioxane and reduced with hydrogen to provide a suspension of metallic platinum. A solution of the product of Example XXIII in dioxane is then added and the mixture hydrogenated at 30–35 lbs. p.s.i. at room temperature until five molecular proportions of hydrogen has been absorbed. The catalyst is then filtered and an equal volume of 5% hydrochloric acid added to the mixture. The mixture is then heated on a water bath at about 80° in order to hydrolyze the benzylamino examine for about 1 hour. The mixture is then cooled and the hydrochloride salt of 9-amino-6-deoxytetracycline recovered.

*Example XXV.—11,12-enolic ethylamino enamine of 5-hydroxy-6-deoxytetracyline*

6-deoxy-5-hydroxytetracycline, 1 g., is mixed with approximately 5 ml. of ethylamine in a glass tube which is then sealed. The tube is heated at 85° C. for 3 hours, chilled in a Dry Ice-acetone bath, and then opened. The ethylamine is evaporated leaving a residue comprised of the ethylamino 11,12-enolic enamine of 5-hydroxytetracycline.

*Example XXVI.—7-(m-nitrophenylazo)-6-deoxy-5-hydroxytetracycline 11,12-enolic ethylamino enamine*

The procedure of Example XXIII is employed in analogous fashion to prepare the m-nitrobenzene diazonium chloride coupling product of the ethylamino enolic 11,12 enamine of 6-deoxy-5-hydroxytetracycline prepared in Example XXIV. The aromatic azo coupling product is recovered in similar fashion.

*Example XXVII.—7-amino-6-deoxy-5-hydroxytetracycline*

The product of Example XXVI is hydrogenated as described in Example XXIV employing ruthenium oxide to prepare the catalyst. In this case, six molecular proportions of hydrogen is absorbed and 7-amino-6-deoxy-5-hydroxytetracycline is recovered.

Example XXVIII.—4-desdimethylamino-6-deoxytetracycline

One part by weight of amphoteric 6-deoxytetracycline is added to 20 parts by weight of 3% hydrochloric acid, the solution is cooled to about 5° C., and two parts by weight of zinc dust is gradually added over a period of about 20 minutes. The mixture is stirred continuously with a volume of chloroform equal to that of the aqueous solution for several additional hours, and the chloroform then separated. The chloroform layer is concentrated in vacuo to provide 4-desdemethylamino-6-deoxytetracycline.

Example XXIX.—4-desdemethylamino-6-deoxytetracycline 11,12-enolic monobenzyl ether One molecular proportion of 4-desdimethylamino-6-deoxytetracycline is dissolved in methanol in which one molecular proportion of sodium has previously been dissolved. A solution of benzyl chloride in methanol is then slowly added and the mixture is then warmed on a steam bath for about 20 minutes. The solvent is then evaporated, the residue washed with water to remove sodium chloride and the insoluble enolic 11,12-monobenzyl ether of 4-desdimethylamino-6-deoxytetracycline recovered.

Example XXX.—7-amino-6-deoxy-4-desdimethylaminotetracycline

The product of Example XXIV is coupled with m-nitrobenzene diazonium chloride by the method described in Example XXIII. The coupling product is then recovered and dissolved in diethylene glycol dimethyl ether and hydrogenated employing rhodium oxide to provide a suspension of rhodium metal as catalyst, according to the procedures outlined in Examples XXIV and XXVII. 7-amino-4-desdimethylamino-6-deoxytetracycline is recovered in conventional manner.

Example XXXI.—9-aminotetracycline

Chlortetracycline is treated as described in Example XII to produce the N-4-benzylbetaine monobenzyl ether thereof. This product is then coupled with benzene diazonium chloride as is described in Example I and the resulting phenylazo compound is hydrogenated, as described in Examples X, XXIV or XXVII to provide 9-aminotetracycline by hydrogenolysis each of the phenylazo and 11,12-enolic benzyl ether groups and the chlorine atom.

Example XXXII.—7-amino-5-hydroxytetracycline

The procedure of Example XXXI is repeated employing 5-hydroxytetracycline rather than 7-chlortetracycline. 7-amino-5-hydroxytetracycline is produced in corresponding fashion.

Example XXXIII.—11,12-enolic enamine formation employing various amines with 6-deoxy-6-demethyltetracycline 6-deoxy-6-demethyltetracycline, 2 g., is heated respectively at about 100° C. for 1 to 4 hours with 10 ml. of benzylamine, 2-ethylhexylamine or butylamine. The 11,12-enolic enamine results from this treatment. The excess amine is removed by distillation in vacuo. The resulting product can then be used directly in the coupling reaction and further transformation of the products thereof as described herein. Alternatively, it can be further purified by dissolving in 10 ml. of methanol and adding the resulting solution in dropwise fashion to a mixture of 10 ml. of hexane and 90 ml. of ether.

The 11,12-enolic benzylamino enamine of 6-deoxy-6-demethyltetracycline exhibits ultra-violet absorption maxima at 268 and 387 m$\mu$, a bioassay (*K. pneumoniae*) of 33 tetracycline units per milligram, and is found on analysis to contain 8.89% N (calc'd. 8.39%).

Example XXXIV.—7-phenylazo-6-deoxy-6-demethyltetracycline 11,12-enolic benzylamino enamine 6-deoxy-6-demethyltetracycline 11,12-enolic benzylamino enamine (Example XXXIII), 250 mg., is dissolved in a mixture of 2 ml. of 1 N aqueous sodium carbonate and 5 ml. of 50% ethanol. A solution containing 1.05 equivalents of benzene diazonium chloride is added thereto. The mixture is stirred until a test on a small aliquot thereof with sodium naphtholate is negative for the presence of diazonium salt. A precipitate separates during the course of the reaction. The slurry is adjusted to pH 6 and the precipitate is collected, washed with water and dried to yield 150 mg. of a light brown amorphous solid. The product exhibits ultra-violet absorption maxima at 267, 387, 403 and 440 m$\mu$; bioassay (*K. pneumoniae*) of 2 mcg./mg.

Example XXXV.—7-amino-6-deoxy-6-demethyltetracycline

One hundred milligrams of the product of Example XXXIV is dissolved in 4 ml. of methanol and 100 mg. of 5% palladium-on-carbon catalyst is added thereto. The mixture is then hydrogenated until two molecular proportions of hydrogen has been absorbed. The catalyst is removed and the solvent evaporated. The residue is dissolved in about 10 ml. of 6 N HCl and warmed on the steam bath for 15 minutes. The product is isolated as the hydrochloride salt by extraction of the cooled aqueous solution with butanol and evaporation of the solvent. It exhibits ultra-violet absorption maxima; 267 and 345 m$\mu$ (1% in 0.01 N methanolic hydrochloric acid).

Example XXXVI.—9-amino-6-demethyltetracycline

Approximately 6 g. of the product of Example IX is dissolved in 100 ml. of diethyleneglycol dimethylether and 10 ml. of triethylamine is added. The mixture is then hydrogenated over a platinum catalyst for approximately 1 hour until three molecular proportions of hydrogen has been absorbed. The mixture is then acidified with hydrochloric acid and diluted with ether. 9-amino-6-demethyltetracycline hydrochloride is precipitated and is recovered by filtration and washed successively with acetone and then ether.

Example XXXVII.—9-amino-6-deoxy-6-demethyltetracycline

The product of Example IX, 6.0 g., is dissolved in 100 ml. of acetic acid and hydrogenated over a platinum catalyst until four molecular proportions of hydrogen has been absorbed. Approximately 20 hours is required. 9-amino-6-demethyl-6-deoxytetracycline is recovered in conventional fashion.

Example XXXVIII.—7-amino-6-demethyltetracycline

The procedure of Example XXXIV is repeated employing 6-demethyltetracycline as the starting material. The resulting 11,12-enolic benzylamino enamine is then coupled with benzenediazonium chloride and then hydrogenated and hydrolyzed to produce 7-amino-6-demethyltetracycline as described in Example XXXV.

Example XXXIX.—7-mercapto-6-deoxy-6-demethyltetracycline

Ten parts by weight of 7-amino-6-demethyl-6-deoxytetracycline 11,12-enolic benzylamino enamine (Example XXXIII) is mixed with 33 parts by weight of 10% aqueous hydrochloric acid at 0° C. and diazotized by the portionwise addition of 20% aqueous sodium nitrite solution. Addition of the sodium nitrite solution is continued until diazotization is complete as indicated by a positive starch iodide test on a few drops of the reaction mixture a few minutes after adding a portion of the sodium nitrite solution.

A solution of sodium disulfide is prepared by dissolving 72 g. of $Na_2S.9H_2O$ and 9 g. of sulfur in 75 ml. of water. This solution is then warmed to 40–50° C.

The 7-amino-6-deoxy-6-demethyltetracycline diazonium salt solution is then adjusted to pH 4.0 and poured into the sodium disulfide solution at 40–50° C. The solution is kept at room temperature for 15 minutes and then acidified to approximately pH 2.0. A heavy precipitate comprised principally of the di-11,12-enolic benzylamino enamine of 7,7'-dithio-bis-[6-deoxy - 6 - demethyltetracycline] forms. The precipitate is collected and the sulfur removed therefrom by triturating with aqueous sodium bicarbonate, filtering and discarding the insoluble material.

The aqueous sodium carbonate solution is treated with 10 g. of zinc dust and stirred at 40° C. for ten minutes resulting in the formation of 7-mercapto-6-deoxy-6-demethyltetracycline 11,12-enolic benzylamino enamine. If desired, this material is isolated by acidifying to pH 3.0. Alternatively, the benzylamino group is hydrolyzed without isolating the intermediate by warming on a steam bath with 6 N hydrochloric acid for 15 minutes in the usual fashion. The use of a nitrogen atmosphere is advisable to avoid air oxidation of the 7-mercapto compound to the 7,7'-dithio-bis-compound.

*Example XL.—7-methylmercapto-6-deoxy-6-demethyltetracycline*

One gram of 7-mercapto-6-deoxy-6-demethyltetracycline (Example XXXIX) is dissolved in approximately 20 ml. of 0.5 N aqueous sodium hydroxide. The alkaline solution is then treated with one molecular proportion of dimethyl sulfate. Acidification results in precipitation of the 7-methylmercapto compound.

*Example XLI.—7-butylmercapto-6-deoxy-6-demethyltetracycline*

The procedure of Example XL is repeated substituting butyl bromide for dimethylsulfate. The product is isolated in similar fashion.

*Example XLII.—7-benzylmercapto-6-deoxy-6-demethyltetracycline*

The procedure of Example XL is repeated substituting benzyl chloride for dimethyl sulfate. The product is isolated in similar fashion.

*Example XLIII.—7-phenylmercapto-6-deoxy-6-demethyltetracycline*

The procedure of Example XL is repeated substituting iodobenzene for dimethyl sulfate. The product is isolated in similar fashion.

*Example XLIV.—7-mercapto-6-demethyltetracycline*

The procedure of Example XXXIX is repeated substituting 7-amino-6-demethyltetracycline (Example XXXVIII) for the 7-amino-6-deoxy-6-demethyltetracycline described therein. The product is isolated in the same manner.

*Example XLV.—7-mercapto-6-deoxy-5-hydroxytetracycline*

The procedure of Example XXXIX is repeated substituting 7 - amino - 6 - deoxy-5-hydroxytetracycline (Example XXVII) for the 7-amino-6-deoxy-6-demethyltetracycline employed therein. The product is isolated in the same manner.

*Example XLVI.—7-(p-chlorophenyl)-azo-6-demethyl-6-deoxy-11a-fluorotetracycline*

To a mixture of 216 mg. (0.5 mole) of 6-demethyl-6-deoxy-11a-fluorotetracycline, in 4 ml. of 0.5 N aqueous sodium carbonate and 1 ml. of 0.5 N aqueous NaOH is added dropwise 20 ml. of p-chlorobenzenediazonium chloride solution (containing an equivalent amount of the reagent). The light precipitate which forms while stirring for 2 hours in an ice bath is filtered off and the mixture neutralized with 4 drops of 2 N HCl to obtain 200 mg. of product. Ultraviolet absorption analysis shows maxima at 250, 271 and 347 m$\mu$ with tailing from 420–500 m$\mu$. The product gives a bioassay (*K. pneumoniae*) of less than 1 mcg./mg.

Similar results are obtained using the corresponding 11a-chloro starting compounds to produce the corresponding 7-(p-chlorobenzene) - azo - 6 - demethyl-6-deoxy-11a-halotetracycline.

*Example XLVII.—7-amino-6-deoxy-6-demethyltetracycline*

A mixture of 50 mg. of the product of Example XLVI dissolved in 3 ml. of methanol containing 1 drop of 2 N HCL and 50 mg. of 5% palladium-on-carbon is hydrogenated at room temperature and atmospheric pressure. After 1¾ hours the reaction stopped at a total uptake of 2.7 ml. of hydrogen gas. After filtration of the catalyst, evaporation of the filtrate gives the product as the dihydrochloride. Ultraviolet absorption analysis shows maxima at 263 and 355 m$\mu$.

The product is shown to be identical with the product obtained from the corresponding nitrotetracycline by paper chromatographic analysis.

*Example XLVIII.—9-phenylazo-7,11a-dichloro-6-deoxy-6-demethyltetracycline*

The procedure of Example XLVI is repeated using 7,11a-dichloro-6-deoxy-6-demethyltetracycline as starting compound and benzene diazonium chloride to obtain this product.

Similar results are obtained using 7,11a-dichloro, dibromo and diiodo starting compounds to produce the corresponding 9-phenylazo-7,11a-dihalo-6-deoxy-6-demethyltetracycline.

*Example XLIX.—9-amino-6-deoxy-6-demethyltetracycline*

The product of Example XLVIII is hydrogenated according to the procedure of Example XLVII to obtain this product.

Employing the procedure of Example XLVI and XLVIII corresponding 11a-halo or 7,11a-dihalo azotetracyclines are prepared and are converted to corresponding aminotetracyclines as described in Example XLVII and XLIX.

*Example L.—7-chloro-6-deoxy-5-hydroxytetracycline*

This compound is produced by diazotization of 7-amino-6-deoxy-5-hydroxytetracycline followed by treatment with cuprous chloride by the method described in the previous examples.

*Example LI.—9-phenylazo-7,11a-dichloro-6-deoxy-5-hydroxytetracycline*

The procedure of Example XLVI is repeated using 7,11a-dichloro-6-deoxy-5-hydroxytetracycline and benzene diazonium chloride as starting materials to obtain this product.

*Example LII.—9-amino-6-deoxy-5-hydroxytetracycline*

This compound is prepared by reduction of the product of Example LI with hydrogen by the method described in the previous examples.

Example LIII.—phenylazo-11a-halotetracyclines

The procedure of Example XLVI is repeated substituting the following 11a-halotetracycline for 11a-fluoro-6-deoxy-6-demethyltetracycline. The 7-phenylazo derivative is the predominant product in the case of those tetracyclines having no 7-halo substituent. The 9-phenylazo derivative is, of course, obtained with the 7-11a-dihalotetracyclines.

11a-chloro-6-deoxy-4-desdimethylaminotetracycline
7-chloro-11a-bromo-6-deoxy-6-demethyltetracycline
7-fluoro-11a-chloro-6-deoxytetracycline
7-bromo-11a-chloro-6-deoxytetracycline
11a-fluoro-6-deoxytetracycline
11a-fluoro-4-desdimethylamino-6-deoxy-6-demethyltetracycline
11a-fluoro-6-deoxy-4-oxytetracycline
7-chloro-11a-fluoro-6-deoxytetracycline
7-bromo-11a-chloro-6-demethyltetracyline
11a-fluoro-4-desdimethylamino-6-deoxytetracycline

Example LIV

The procedure of Example III is applied to the following 11a-halo tetracyclines to produce the corresponding arylazo D-ring substituted products:

11a-fluoro-6-deoxytetracycline
11a-fluoro-6-deoxy-5-oxytetracycline
7-chloro-11a-fluoro-6-deoxytetracycline
7-bromo-11a-chloro-6-deoxy-6-demethyltetracycline

Example LV

The products of Examples LIII and LIV are reduced according to the procedure of Example XLVII to give the corresponding dehalogenated D-ring amino substituted tetracyclines.

Example LVI.—9-amino-6-demethyl-6-deoxytetracycline 10.94 g. of 11a-chloro-6-demethyl-6-deoxytetracycline sulfate is dissolved in 40 ml. of HF at 0° C. With stirring 2.1 g. of $KNO_3$ is added. The solution was stored at 0° for 16 hours and then poured into a solution of 400 ml. of isopropyl alcohol and 30 ml. of 48% HBr at —5° C. After stirring for 1 hour the suspension is filtered, washed with isopropyl alcohol and dried to give the crude product.

Pure material is obtained by dissolving the product in 200 ml. of boiling $CH_3OH$, treating with activated charcoal and adding 5 ml. of 40% $HClO_4$ to give on filtration 9-nitro-11a-chloro-6-demethyl-6-deoxytetracycline perchlorate.

An analytical sample is prepared by recrystallization from boiling $CH_3OH$.

The above product (4 g.) in 200 ml. of $CH_3OH$ is hydrogenated at 25° C. in the presence of 2 g. of 5% palladium-on-charcoal at atmospheric pressure until the uptake of $H_2$ is complete. The catalyst is removed by filtration and the product isolated by evaporation of the solvent in vacuo to give 9-amino-6-demethyl-6-deoxytetracycline.

Example LVII.—9-iodo-6-demethyl-6-deoxytetracycline 1.4 g. (3 mM.) of 9-amino-6-demethyl-6-deoxytetracycline hydrochloride dissolved in 10 ml. of 2 N sulfuric acid is cooled in an ice-bath and diazotized with 3.5 ml. of 1 N sodium nitrite solution introduced slowly below the surface of the liquid. After stirring 15 minutes, 30 mg. of urea is added to destroy the excess nitrous acid. Hydriodic acid (1 ml. of 47%) is then added whereupon a yellow solid precipitates. The mixture is stirred at room temperature for 30 minutes and then brought gradually to 50° C. and stirred for 20 minutes. Nitrogen is evolved. The dark mixture is cooled and adjusted to pH 5.5. The precipitate of crude 9-iodo-6-demethyl-6-deoxytetracycline is filtered off, washed and dried in vacuo over phosphorous pentoxide.

The crude is purified by suspending in water and adding sufficient 2 N hydrochloric acid to effect solution. Sodium bisulfite is added and the pH adjusted to 5.5. The resulting solution is extracted at least four times with ethylacetate. The extract is dried with anhydrous sodium sulfate then concentrated in vacuo to incipient crystallization. The suspension is then brought into solution by heating to boiling, a little methanol is added to facilitate solution, and allowed to crystallize. After chilling overnight, the fine yellow needles are filtered off, washed with ether and dried.

The product exhibits maxima in the ultraviolet at 235 (shoulder), 266 and 350 m$\mu$ in 0.01 N HCl and at 230, 243, 263 (shoulder) and 392 m$\mu$ in 0.01 N NaOH.

*Analysis.*—Calcd. for $C_{21}H_{21}N_2O_7$ I.MeOH: 46.2% C; 4.4% H; 4.89% N; 22.2% I. Found: 46.7% C; 4.31% H; 4.82% N; 21.32% I.

The p-toluene sulfonate salt is prepared according to standard procedures. Calcd. for $C_{28}H_{29}N_2O_{10}IS$: 3.92% N. Found 3.81% N.

Example LVIII.—9-chloro-6-demethyl-6-deoxytetracycline

To 1.04 g. of 9-amino-6-demethyl-6-deoxytetracycline hydrochloride dissolved in 5 ml. water and 2 ml. of concentrated hydrochloric acid cooled in an ice-bath is added 150 mg. of sodium nitrite in 2 ml. water below the surface of the liquid. After stirring 20 minutes, 50 mg. of urea is added to destroy the excess nitrous acid. Cuprous chloride/hydrogen chloride is added and the mixture stirred at room temperature for 5 minutes. It is then immersed in a 50° C. water bath for 20 minutes then cooled and extracted with n-butanol. The extract is dried with sodium sulfate and evaporated to dryness.

The cuprous chloride is prepared by adding a hot solution of 600 mg. copper sulfate pentahydrate, and 160 mg. sodium cloride in 2 ml. water to 160 mg. sodium bisulfite in 1.7 ml. 1.1 N sodium hydroxide. The mixture is cooled centrifuged and the solid washed with 1 ml. water. It is then dissolved in 1 mg. concentrated HCl and used above.

The crystalline p-toluenesulfonate salt is prepared by standard procedure. Calcd. for $C_{28}H_{29}O_{10}N_2ClS$: 54.15% C; 4.79% H; 4.51% N. Found: 54.37% C; 4.93% H; 4.59% N.

Example LIX.—9-bromo-6-demethyl-6-deoxytetracycline

The procedure of Example LVII is repeated but using cuprous bromide in place of cuprous chloride to give 9-bromo-6-demethyl-6-deoxytetracycline.

The p-toluenesulfonate and the naphthalene-$\beta$-sulfonate salts are prepared according to well known procedures.

p-Toluenesulfonate $C_{28}H_{29}O_{10}N$ BrS, calcd.; 50.53% C; 4.38% H; 4.21% N. Found 50.24% C; 4.53% H; 4.23% N.

Naphthalene-$\beta$-sulfonate, calcd: 51.74% C; 4.34% H; 3.88% N. Found: 51.45% C; 4.22% H; 4.10% N.

Example LX.—9-formylamino-6-demethyl-6-deoxytetracycline

To 4.34 g. of 9-amino-6-demethyl-6-deoxytetracycline and 40 ml. of dry pyridine cooled in an ice-bath is added 20 ml. of acetoformic acid. The mixture is stirred for 15 minutes then poured into one liter of anhydrous ether. The product is filtered off, slurried in ether and recovered by filtration and dried.

The product is suspended in 100 ml. of water and stirred for 10 minutes in order to hydrolyze the $O^{12a}$-ester group. The pH is adjusted to 5.5 and the crude formyl product isolated by freeze-drying.

The product is purified by chromatography on a cellulose column.

Example LXI.—9-acetylamino-6-demethyl-6-deoxytetracycline

To 4.2 g. of 9-amino-6-demethyl-6-deoxytetracycline in 200 ml. of anhydrous tetrahydrofuran and 200 ml. of dry methanol is added 20 ml. of acetic anhydride. The mixture is stirred for 45 minutes at room temperature then concentrated to small volume under reduced pressure and the concentrate added to dry ether. The product is filtered, slurried in ether, filtered and dried.

In like manner the propionyl and butyryl derivatives are prepared using the anhydrides of propionic and butyric acid, respectively in place of acetic anhydride.

Example LXII.—Acylamino

The D-ring amino compounds of the preceding examples are converted to their acyl derivatives by the procedures of Examples LX and LXI.

Example LXIII.—7-halo tetracyclines

Three parts by weight of the product of Example X is mixed with 10 parts by weight of 10% aqueous hydrochloric acid at 0° C. and diazotized by the gradual addition of 20% aqueous sodium nitrite solution. Addition of the sodium nitrite solution is continued until a positive starch iodide test on a few drops of the reaction mixture is obtained in the conventional fashion. The resulting solution is then added to 15 parts of a boiling 10% solution of cuprous chloride in aqueous hydrochloric acid. The mixture is boiled for 10 minutes and then allowed to cool. The product is recovered by diluting the cooled mixture with 100 parts by weight of water and extracting with butanol. Crude 7-chloro-6-deoxytetracycline hydrochloride, obtained by evaporation of the solvent layer, is further purified in conventional manner. Treatment of it with an equivalent quantity of base provides amphoteric 7-chloro-6-deoxytetracycline. The product has a high degree of antibiotic activity against tetracycline resistant organisms and superior acid stability.

Repetition of this procedure but substitution of hydrobromic acid and cuprous bromide for hydrochloric acid cuprous chloride produces 7-bromo-6-deoxytetracycline.

Replacement of 7-amino-6-deoxytetracycline in the above procedures by 7-amino-6-deoxy-6-demethyltetracycline produces 7-chloro and 1-bromo-6-deoxy-6-demethyltetracycline.

Example LXIV.—7-iodotetracyclines

The procedure of Example LXIII is repeated substituting dilute sulfuric acid for hydrochloric acid and potassium iodide. 7-iodo-6-deoxytetracycline and 7-iodo-6-deoxy-6-demethyltetracycline are obtained.

Example LXV.—9-phenylazo-7-halotetracyclines

The procedure of Example I is repeated using the 7-halotetracyclines of Examples XV, LXII and LXIV in lieu of tetracycline to give the corresponding 9-phenylazo-7-halotetracyclines.

Example LXVI.—9-phenylazo-7-fluoro-6-deoxytetracycline

The procedure of Example XIV is applied to 7-amino-6-deoxytetracycline which is coupled with benzenediazonium chloride according to the process of Example I.

Example LXVII.—9-D-ring substituted-6-deoxy-5-hydroxytetracyclines

Following the procedures of Examples XIV, XVI, XX, XXXIX, XLI and L, 9-amino-6-deoxy-5-hydroxytetracycline is converted to the corresponding 9-fluoro, cyano-, arsenoxy-, mercapto-, butylmercapto- and chloro derivative.

Example LXVIII.—9-amino-5-hydroxytetracycline

The procedure of Example X is applied to 9-phenylazo-7-bromo-5-hydroxy-tetracycline (Example I) to produce 9-amino-5-hydroxytetracycline.

Example LXIX.—9-fluoro-6-deoxy-6-demethyltetracycline

The procedure of Example XIV is applied to 9-amino-6-deoxy-6-demethyltetracycline to produce 9-fluoro-6-deoxy-6-demethyltetracycline. This is converted to the hydrochloride, sulfate, hemisuccinate, succinate, nitrate, perchlorate, hydrobromide, phosphate, hydrofluoride, p-toluenesulfonate, hydroiodide, tartrate, acetate, malate, benzoate, gluconate, citrate, glycollate and malate, and other acid addition salts by treatment with the appropriate acid.

Example LXX.—Metal salts

The sodium salts of the present new tetracyclines are prepared by dissolving the amphoteric substances in water containing an equimolar amount of sodium hydroxide and freeze drying the resulting mixture.

In this fashion, other metal salts are prepared including potassium, calcium, barium, lithium and strontium salts.

The metal salt complexes of the present new tetracyclines are prepared by dissolving them in a lower aliphatic alcohol, preferably methanol, and treating with an equimolar amount of the selected metal salt, preferably dissolved in the selected alcohol. The complexes are isolated in some instances by simple filtration, but often, since many of them are alcohol soluble, by evaporation of the solvent or addition of a non-solvent such as diethyl ether.

In this fashion, metal salt complexes of the present new tetracyclines consisting primarily of compounds containing a 1:1 ratio of metal to tetracycline are prepared employing the following metal salts: calcium chloride, cobalt chloride, magnesium sulfate, magnesium chloride, stannous chloride, zinc chloride, cadmium chloride, barium chloride, silver nitrate, stannous nitrate, strontium nitrate, magnesium acetate, manganous acetate, palladium chloride, manganous chloride, cerium chloride, titanium chloride, platinum chloride, vanadium chloride, plumbous acetate stannous bromide, zinc sulfate, chromous chloride and nickellous chloride.

Example LXXI.—11a-chloro-6-demethyl-6-deoxytetracycline

A mixture of 2 grams of 6-demethyl-6-deoxytetracycline hydrochloride and 0.8 g. of N-chlorosuccinimide in 30 ml. of $CF_3COOH$ is stirred and heated on a steam bath for 5 minutes. After cooling, the mixture is added dropwise to 500 ml. of stirred ether at 0° C. The product separates and is then slurried four times with ether.

Example LXXII.—7,11a-dichloro-6-demethyl-6-deoxytetracycline

The product of Example LXXI is stirred with 0.8 g. of N-chlorosuccinimide in 17 ml. of trifluoroacetic acid on a steam bath for thirty minutes. After cooling, the mixture is added dropwise to 500 ml. of stirred ether at 0° C. The hard, oil gum is separated and slurried four times with ether to obtain the product.

The product is also obtained from 6-deoxy-6-demethyltetracycline by this procedure employing 1.6 g. in lieu of 0.8 of the chlorinating agent.

A sample of the product in 0.01 N-methanolic HCl shows maxima on ultraviolet absorption analysis at 270 and 358 mμ. Infrared analysis is a KBr pellet at a concentration of 1% shown absorption at the following wavelengths: 2.95–3.45, 3.36, 4.15, 5.73, 5.87, 6.10 (6.40), 6.90.

Example LXXIII.—11a-fluoro-6-demethyl-6-deoxytetracycline

A suspension of 4.6 g. (10 mmoles) of 6-demethyl-6-deoxytetracycline hydrochloride in 60 ml. of methanol is cooled to 0° C. and nitrogen gas bubbled through. A solution of 20 ml. of a normal solution of sodium methoxide in methanol (20 mmoles) is added and the mixture saturated with perchloryl fluoride. The mixture is then maintained in a refrigerator for 24 hours during which time the suspension becomes a clear yellow solution which deposits 3.5 g. of cream colored crystals of the product as the chlorate salt. The filtrate yields a second crop of crystals of less pure product.

Ultraviolet analysis shows maxima at 270 and 350 mμ.

*Example LXXIV.—11a-halogenation*

The tetracycline starting compound is dissolved in the selected solvent and an equivalent of chlorinating, brominating or iodinating agent is added to the resulting mixture. After stirring at room temperature for ¼ to 24 hours, the mixture is added dropwise to a non-solvent, usually ether, at about 0° C. The product separates and is collected by filtration. If desired, the product is repulped several times with ether.

This procedure is used for the preparation of the following 11a-halotetracyclines from corresponding tetracyclines:

11a-bromo-6-deoxy-6-demethyltetracycline
11a-bromo-6-deoxytetracycline
11a-bromo-6-deoxy-5-oxytetracycline
11a-iodo-6-deoxy-6-demethyltetracycline
11a-iodo-6-deoxytetracycline
11a-chloro-6-deoxy-4-desdimethylaminotetracycline
11a-bromo-6-deoxy-6-demethyl-4-desdimethylamino-
  tetracycline
7-chloro-11a-bromo-6-deoxy-6-demethyltetracycline
7-fluoro-11a-chloro-6-deoxytetracycline
7-bromo-11a-chloro-6-deoxytetracycline
7,11a-dibromo-6-deoxy-6-demethyltetracycline
7,11a-dibromo-6-deoxytetracycline Halogenating agents useful in this regard include: chlorine, bromine, iodochloride, iodobromide, N-bromosuccinimide, N-chlorosuccinimide, N-iodosuccinimide, N-bromoacetamide, N-chloroacetamide, N-iodoacetamide, N-chloracetanilide, N-bromophthalimide, 3-chloro-3,5-dimethylhydantoin, 3-bromo-5,5-dimethylhydantoin, 3,5-dibromo-5,5-dimethylhydantoin, 3,5-dichloro-5,5-dimethylhydantoin, tertiary butylhypochlorite, pyridinium perchloride and perbromide salts. Reaction-inert solvents include dioxane, tetrahydrofuran, diglyme, monoglyme, water, carbon tetrachloride and chloroform.

*Example LXXV.—11a-fluorination*

The tetracycline compound in the selected solvent containing a basic catalyst is treated with perchloryl fluoride at atmospheric or superatmospheric pressure. For the latter, a conventional pressure vessel is suitable. The mixture is preferably allowed to stand at a temperature between —10° and 10° C., usually at 0° to 5° C. At the end of about a 24 hours period, the product usually precipitates. In some cases, it may be necessary to effect precipitation by concentration and/or the addition of a non-solvent such as ether.

Using this procedure, the following 11a-fluorotetracyclines are prepared from corresponding starting compounds:

11a-fluoro-6-deoxytetracycline
11a-fluoro-4-desdimethylamino-6-deoxy-6-demethyl-
  tetracycline
11a-fluoro-6-deoxy-5-oxytetracycline
7-chloro-11a-fluoro-6-deoxytetracycline
7-bromo-1a-fluoro-6-deoxy-6-demethyltetracycline
11a-fluoro-4-desidimethylamino-6-deoxytetracycline Suitable reaction solvents are preferably lower alkanols, e.g. methanol and ethanol. Additional solvents are dioxane, water, tetrahydrofuran, diglyme and monoglyme. Basic catalysts include sodium methoxide, potassium ethoxide, lithium propoxide, sodium hydroxide, lithium hydroxide, potassium carbonate and sodium bicarbonate and carbonate.

In fluorinating 4-desdimethylaminotetracyclines, the reaction is preferably carried out in lower alkanols and the product precipitated by water addition after about 10–20 minutes' reaction time.

What is claimed is:

1. An aryl azo compound selected from the group consisting of

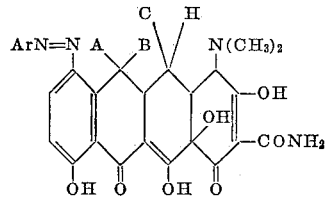

and

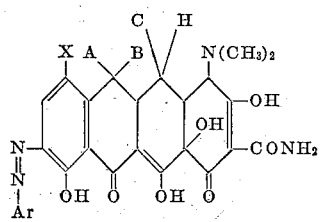

wherein A is selected from the group consisting of H and CH₃; B and C are each selected from the group consisting of H and OH wherein A is CH₃ when C is OH; X is halogen, and Ar is the aromatic residue of a diazotizable aromatic primary amine containing from 6–12 carbon atoms.

2. An aryl azo compound selected from the group consisting of the 12 ethers of

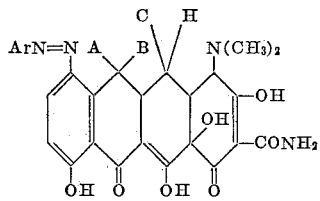

and

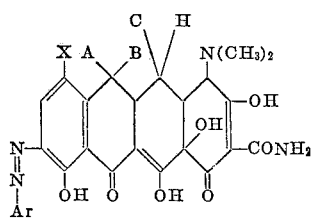

wherein A is selected from the group consisting of H and CH₃; B and C are each selected from the group consisting of H and OH wherein A is CH₃ when C is OH; X is halogen, and Ar is the aromatic residue of a diazotizable aromatic primary amine containing from 6 to 12 carbon atoms, the etherifying group being benzyl when A is CH₃ and B is OH and being selected from the group consisting of lower alkyl and benzyl when at least one of A and B is hydrogen.

3. An aryl azo compound selected from the group consisting of the N⁴-benzyl betaines of

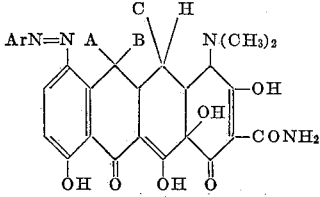

and

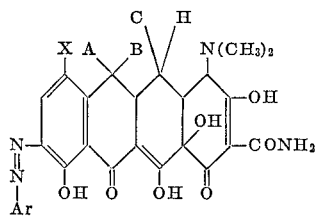

wherein A is selected from the group consisting of H and CH₃; B and C are each selected from the group consisting of H and OH wherein A is CH₃ when C is OH; X is halogen and Ar is the aromatic residue of a diazotizable aromatic primary amine containing from 6 to 12 carbon atoms.

4. An aryl azo compound selected from the group consisting of

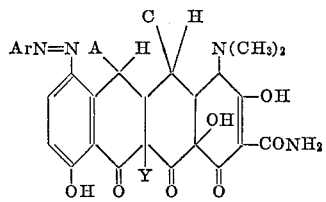

and

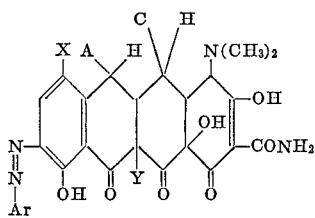

wherein A is selected from the group consisting of H and CH₃; C is selected from the group consisting of H and OH wherein A is CH₃ when C is OH; X is halogen; Ar is the aromatic residue of a diazotizable aromatic primary amine containing from 6 to 12 carbon atoms, and Y is selected from the group consisting of fluoro and chloro.

5. A compound selected from the group consisting of

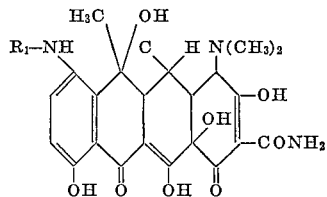

and

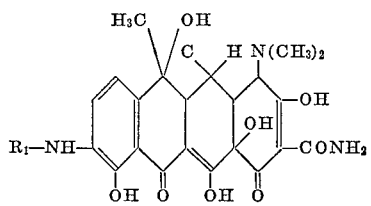

the metal salts thereof, and the acid addition salts thereof wherein C is selected from the group consisting of H and OH and R₁ is selected from the group consisting of hydrogen, and alkanoyl containing 1 to 4 carbon atoms.

6. 7-aminotetracycline.
7. 7-fluoro-6-deoxy-6-demethyltetracycline.
8. 7-fluoro-6-deoxy-5-hydroxytetracycline.
9. 9-thiocyanato-6-demethyltetracycline.
10. 7-cyanato-6-demethyltetracycline.
11. 9-fluoro-6-deoxytetracycline.
12. 7-amino-5-hydroxytetracycline.
13. 9-bromo-6-deoxy-6-demethyltetracycline.
14. 7-chloro-6-deoxy-5-hydroxytetracycline.
15. 9-aminotetracycline.
16. A compound selected from the group consisting of

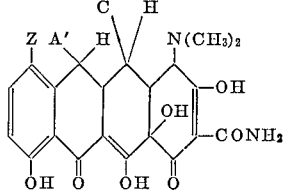

and

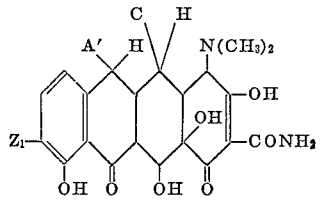

and the pharmaceutically acceptable metal and acid addition salts thereof wherein A' is selected from the group consisting of H, OH and CH₃; C is selected from the group consisting of H and OH wherein A' is CH₃ when C is OH; Z is selected from the group consisting of fluoro, cyano, cyanato, thiocyanato, arsenoxy, azido, mercapto and SR wherein R is alkyl having up to 10 carbon atoms, phenyl and benzyl; Z, is selected from the group consisting of Z, chloro, bromo and iodo.

17. An aryl azo compound selected from the group consisting of the 12-enamines of

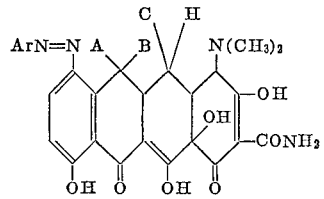

and

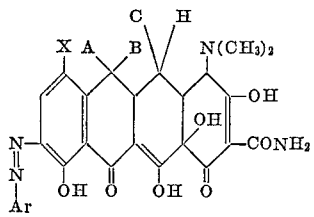

wherein A is selected from the group consisting of H and CH₃; B and C are each selected from the group consisting of H and OH wherein A is CH₃ when C is OH, X is halogen and Ar is the aromatic residue of a diazotizable aromatic primary amine containing from 6 to 12 carbon atoms, the enamine group being selected from the group consisting of —NH benzyl, —NH lower alkenyl, —NH lower alkyl, —NH cycloalkyl and —NH₂.

18. An aryl azo compound selected from the group consisting of the 11-enamines of

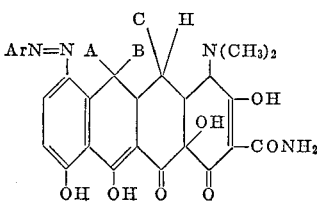

and

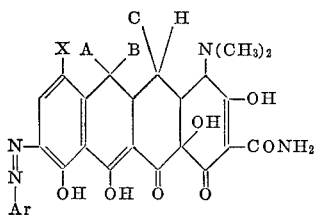

wherein A is selected from the group consisting of H and CH₃; B and C are each selected from the group consisting of H and OH wherein A is CH₃ when C is OH, X is halogen and Ar is the aromatic residue of a diazotizable aromatic primary amine containing from 6 to 12 carbon atoms, the enamine group being selected from the group consisting of —NH benzyl, —NH lower alkenyl, —NH lower alkyl, —NH cycloalkyl and —NH₂.

19. An aryl azo compound selected from the group consisting of the 11-ethers of

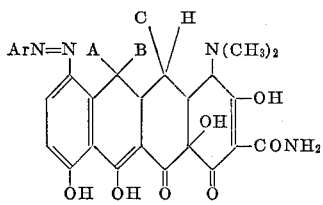

and

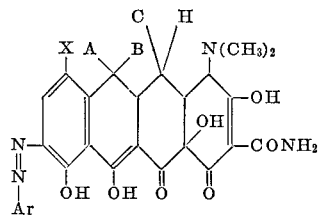

wherein A is selected from the group consisting of H and CH₃; B and C are each selected from the group consisting of H and OH wherein A is CH₃ when C is OH; X is halogen, and Ar is the aromatic residue of a diazotizable aromatic primary amine containing from 6 to 12 carbon atoms, the etherifying group being benzyl when A is CH₃ and B is OH and being selected from the group consisting of lower alkyl and benzyl when at least one of A and B is hydrogen.

20. 9-amino-5-hydroxytetracycline.

References Cited by the Examiner

UNITED STATES PATENTS 3,160,661   12/1964   McCormick _____ 260—559

FOREIGN PATENTS 107   4/1958   Jordan.
110   4/1958   Jordan.
5,618   8/1960   Peru.

NICHOLAS S. RIZZO, *Primary Examiner.*

IRVING MARCUS, *Examiner.*

JAMES W. ADAMS, E. E. BERG, *Assistant Examiners.*